(12) United States Patent
Roth

(10) Patent No.: US 8,571,773 B2
(45) Date of Patent: Oct. 29, 2013

(54) GEAR SELECTION METHOD FOR AN AUTOMATIC TRANSMISSION FOR A TRACTION PHASE AFTER A COASTING PHASE OF A MOTOR VEHICLE

(75) Inventor: Martin Roth, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 176 days.

(21) Appl. No.: 13/158,855

(22) Filed: Jun. 13, 2011

(65) Prior Publication Data

US 2011/0313631 A1    Dec. 22, 2011

(30) Foreign Application Priority Data

Jun. 16, 2010 (DE) .......................... 10 2010 024 045

(51) Int. Cl.
    *G06G 7/63*      (2006.01)

(52) U.S. Cl.
    USPC .................. 701/60; 701/67; 701/80; 701/95; 477/107; 477/115

(58) Field of Classification Search
    USPC .................. 701/60, 67, 95, 80; 477/107, 115
    See application file for complete search history.

(56) References Cited

U.S. PATENT DOCUMENTS

| | | | |
|---|---|---|---|
| 4,841,815 A | | 6/1989 | Takahashi |
| 5,514,051 A | | 5/1996 | Heid et al. |
| 5,794,170 A | * | 8/1998 | Kuroda et al. ................. 701/93 |
| 5,832,400 A | * | 11/1998 | Takahashi et al. ............... 701/53 |
| 6,553,301 B1 | * | 4/2003 | Chhaya et al. .................. 701/54 |
| 6,633,006 B1 | * | 10/2003 | Wolf et al. ................. 177/25.13 |
| 7,354,378 B2 | * | 4/2008 | Ochi et al. ..................... 477/115 |
| 7,979,185 B2 | * | 7/2011 | Wolfgang et al. ............... 701/64 |
| 2009/0192664 A1 | * | 7/2009 | Wolfgang et al. ............... 701/29 |
| 2012/0157262 A1 | * | 6/2012 | Bastian et al. ................. 477/182 |

FOREIGN PATENT DOCUMENTS

| | | |
|---|---|---|
| DE | 10327438 | 1/2004 |
| JP | 63-246546 | 10/1988 |
| JP | 7-57988 | 2/1995 |

OTHER PUBLICATIONS

English Translation of Examination Report for Japanese Application No. 2011-132373 (pp. 2-11), Mar. 5, 2013.

* cited by examiner

*Primary Examiner* — Mary Cheung
*Assistant Examiner* — Truc M Do
(74) *Attorney, Agent, or Firm* — RatnerPrestia

(57) ABSTRACT

Disclosed herein is a gear selection method and device for an automatic transmission for a traction phase (Z2) after a coasting phase (S) of a motor vehicle. According to the method, in a traction phase (Z1) before the coasting phase (S), a sliding average value of the rotational speed level (n) and/or of the traction force level ($F_x$) is formed depending on the particular velocity (v) and particular gradient (ST) and is taken into consideration for defining at least one gear choice of the automatic transmission for the traction phase (Z2) after the particular coasting phase (S).

11 Claims, 4 Drawing Sheets

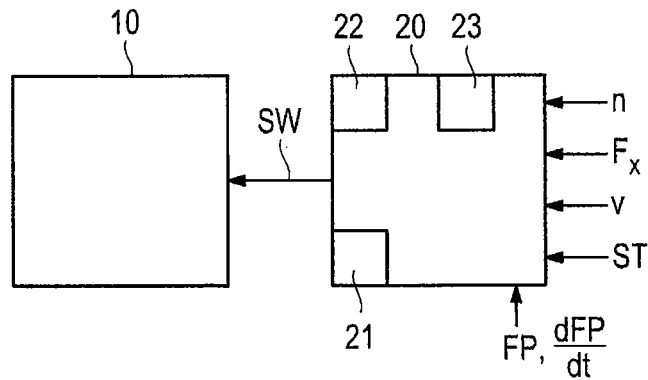
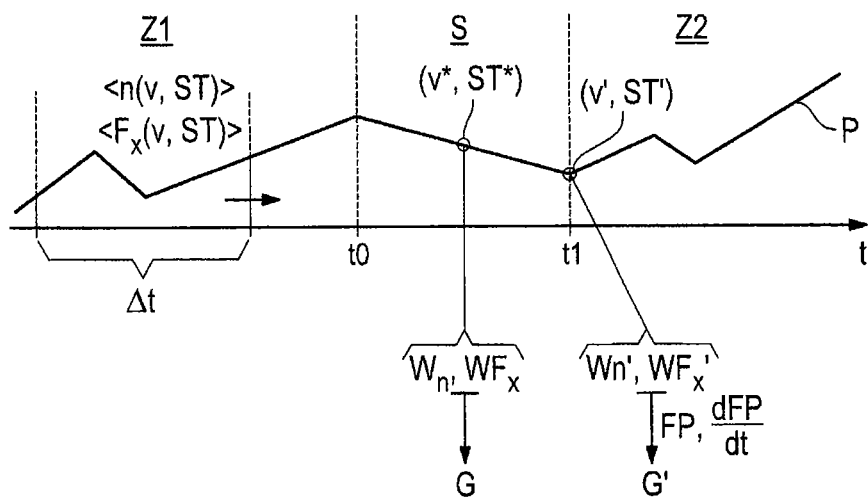
Fig. 1
Fig. 2

GEAR SELECTION METHOD FOR AN AUTOMATIC TRANSMISSION FOR A TRACTION PHASE AFTER A COASTING PHASE OF A MOTOR VEHICLE

CROSS-REFERENCE TO RELATED APPLICATION

This U.S. patent application claims priority to German Patent Application DE 10 2010 024 045.1, filed Jun. 16, 2010, which is incorporated by reference herein in its entirety.

FIELD OF INVENTION

The present invention relates to a gear selection method for an automatic transmission for a traction phase after a coasting phase of a motor vehicle.

BACKGROUND OF THE INVENTION

For the use of motor vehicles which are more environmentally friendly, various alternatives to the conventional internal combustion engine, for example the use of hybrid drives, are known.

A further option for reducing consumption is a so-called "coasting function", also referred to as a "free-wheeling function" which is used in order to reduce the energy consumption in predetermined driving states by the drive being switched off and the automatic transmission being shifted into the neutral position or with the clutch open.

In previous coasting driving strategies, the following approaches have been taken. In a first strategy, the gear from the traction phase before the coasting was retained. In a sporty driving mode, i.e. at a low gear, a large jump in rotational speed may occur, since the selected gear is too low when driving downhill with an increase in velocity. Furthermore, the gear may no longer be appropriate after a long coasting phase and after steady driving and then greater acceleration being required. In the latter case, the gear would be too high, i.e. the traction force would be too low, and re-shifting would be necessary. A second strategy involves engaging the highest possible gear. The gear is not appropriate in a normal to sporty driving mode. It is too high, i.e. the traction force is too low, and therefore re-shifting is necessary. A third strategy envisages tracking of the gear after the normal shifting program taking into consideration the sporty factor of the transmission. This is possible during coasting with a gas pedal value>0, but the gear selection is often implausible. During coasting with a gas pedal value of 0, the shifting program is not appropriate.

DE 103 27 438 A1, which is incorporated by reference, describes a method for controlling and/or regulating a transmission, wherein a means of preventing up shifting can be deactivated in the "coasting function active" operating state. The described up shifting strategy during the coasting operation indicates that, after the ending of the coasting function, a predeterminable shifting characteristic can be selected.

It is therefore an object of the present invention to provide an improved gear selection method and an improved gear selection device for an automatic transmission for a traction phase after a coasting phase of a motor vehicle, the method and device permitting good adaptability to the driver's dynamic strategy.

SUMMARY OF THE INVENTION

The gear selection method according to aspects of the invention for an automatic transmission for a traction phase after a coasting phase of a motor vehicle, as defined in the independent claims, has the advantage of taking the driver's dynamic requirement into consideration in the traction phase before the particular coasting phase for the coming traction phase.

The concept on which the present invention relates consists in that in a traction phase before the coasting phase, a sliding average value of the rotational speed level and/or of the traction force level is formed depending on the particular velocity and particular gradient and is taken into consideration for defining at least one gear choice of the automatic transmission for the traction phase after the particular coasting phase.

Advantageous developments and improvements of the method according to aspects of the invention are found in the dependent claims.

According to a preferred development, the driver's rotational speed requirement is defined taking into consideration the sliding average value of the rotational speed level for the current velocity and the current gradient at the end of the coasting phase and a corresponding gear choice as defined on the basis thereof.

According to another preferred development, the driver's traction force requirement is defined taking into consideration the sliding average value of the traction force level for the current velocity and the current gradient at the end of the coasting phase, after which the traction force requirement is converted into a corresponding rotational speed/engine torque requirement and a corresponding gear choice is defined on the basis thereof.

According to another preferred development, the driver's rotational speed requirement is defined taking into consideration the sliding average value of the rotational speed level for the current velocity and the current gradient at the end of the coasting phase and a corresponding first and second gear choice are defined on the basis thereof, wherein the first gear choice corresponds to a rotational speed requirement above the value determined by the sliding average, and wherein the second gear choice corresponds to a rotational speed requirement below the value determined by the sliding average.

According to another preferred development, the driver's traction force requirement is defined taking into consideration the sliding average value of the traction force level for the current velocity and the current gradient at the end of the coasting phase, the traction force requirement is converted into a corresponding rotational speed requirement and a corresponding first and second gear choice are defined on the basis thereof, wherein the first gear choice corresponds to a traction force requirement above the value determined by the sliding average, and wherein the second gear choice corresponds to a traction force requirement below the value determined by the sliding average.

According to another preferred development, at the time of the end of a particular coasting phase, a determination of a current gas pedal actuating value and/or of a current gas pedal actuating gradient is carried out and the at least one defined gear choice is adapted depending thereon. In this case, the rotational speed requirement and the traction force requirement, weighted in a defined manner from the recorded data, can enter into the determination of the values for the rotational speed and the traction force at the end of the coasting phase.

According to another preferred development, the automatic transmission does not permit pre-engagement of the defined gear choice, wherein the gear choice is engaged at the end of the coasting phase, the rotational speed at the end of the coasting phase is synchronized and subsequently a frictional connection is established.

According to another preferred development, the automatic transmission permits pre-engagement of a single defined gear choice, wherein the gear choice is engaged during the coasting phase, the rotational speed at the end of the coasting phase is synchronized and subsequently a frictional connection is established.

According to another preferred development, the automatic transmission permits pre-engagement of two defined gear choices, wherein the first and second gear choices are engaged during the coasting phase, the gear from the first and second gear choices, which gear is prioritized in accordance with a predefined criterion, is defined at the end of the coasting phase as the final gear choice, the rotational speed at the end of the coasting phase is synchronized and subsequently a frictional connection is established.

According to another preferred development, a time window within which the sliding average value of the rotational speed level and/or of the traction force level is formed is variable depending on at least one driving parameter.

BRIEF DESCRIPTION OF THE DRAWINGS

The invention is best understood from the following detailed description when read in connection with the accompanying drawings. Included in the drawings are the following figures:

FIG. 1 shows a block diagram of a gear selection device for an automatic transmission for a traction phase after a coasting phase of a motor vehicle, according to one embodiment of the present invention;

FIG. 2 shows an exemplary illustration of a route profile for explaining the functioning of the gear selection device of an automatic transmission for a traction phase after a coasting phase of a motor vehicle according to FIG. 1;

DETAILED DESCRIPTION OF THE PREFERRED EMBODIMENTS

Figure 3:
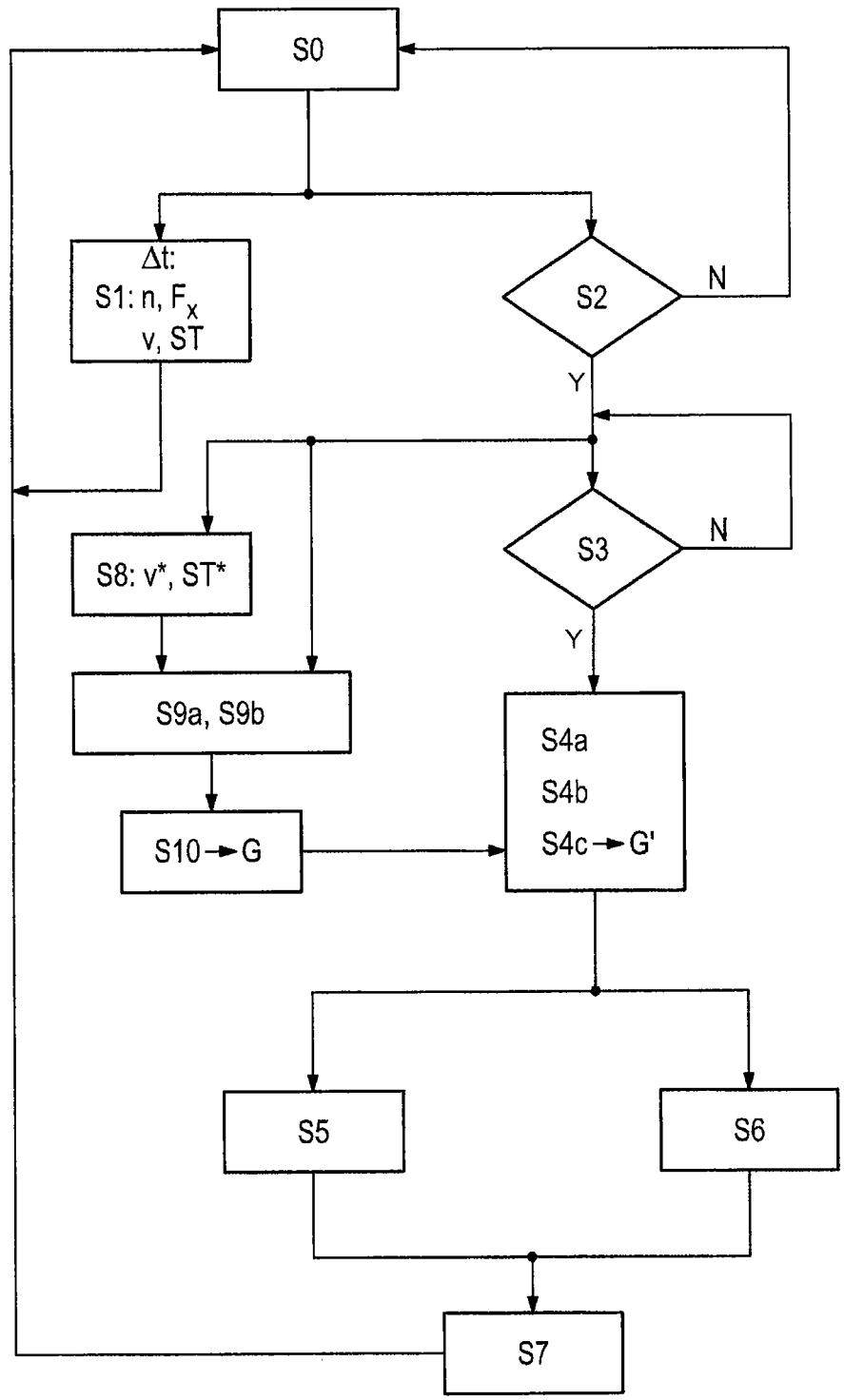
FIG. 3 shows a flow diagram for explaining an embodiment of the gear selection method according to aspects of the invention for an automatic transmission for a traction phase after a coasting phase of a motor vehicle.

In the figures, the same reference symbols refer to identical or functionally identical elements.

FIG. 1 shows a block diagram of a gear selection device for an automatic transmission for a traction phase after a coasting phase of a motor vehicle, according to one embodiment of the present invention.

In FIG. 1, reference symbol 10 denotes an automatic transmission which can be shifted by a shifting signal SW of a gear selection device 20 for an automatic transmission. The device 20 is designed to receive the driving parameters rotational speed n, traction force $F_x$, velocity v, gradient ST and gas pedal actuating value FP and also gas pedal actuating gradient dFP/dt.

The device 20 has a computational device 21, thus enabling, in a traction phase Z1 before a coasting phase S, a sliding average value of the rotational speed level n and/or of the traction force level $F_x$ to be formed depending on the particular velocity v and the particular gradient ST. A memory device 22 serves to store the sliding average value of the rotational speed level n and/or of the traction force level $F_x$.

On the basis of the sliding average value of the rotational speed level n and/or of the traction force level $F_x$ during the coasting phase S a defining device 23 defines at least one gear choice of the automatic transmission 10 for the subsequent traction phase Z2.

A current gas pedal actuating value FP and/or a current gas pedal actuating gradient dFP/dt is determined preferably directly at the beginning of the traction phase Z2 and the gear choice defined previously by the defining device 23 is adapted, if required.

In other words, the gear choice includes not only the history, expressed by the sliding average value of the rotational speed level n and/or of the traction force level $F_x$, but also the driver's current dynamic requirement at the end of the coasting phase, expressed by the gas pedal actuating value FP and/or the gas pedal actuating gradient dFP/dt.

If the dynamic requirement which is interpreted by the gas pedal actuating value FP and/or the gas pedal actuating gradient dFP/dt during the coasting phase S has not changed, then, for example, there will be no change to the gear choice defined previously. If a corresponding change has occurred, then a corresponding change in the gear choice expediently takes place in accordance with predetermined adaptation criteria.

FIG. 2 shows an exemplary illustration of a route profile for explaining the functioning of the gear selection device of an automatic transmission for a traction phase after a coasting phase of a motor vehicle according to FIG. 1.

In FIG. 2, the reference symbol P denotes a route profile with gradients ST, which are assumed to be constant in sections for simplification reasons, depending on the driving time t.

During a traction phase Z1, a sliding average value $<n(v, ST)>$ is formed depending on the respectively current velocity v and gradient ST. The corresponding time interval of the sliding averaging is denoted by $\Delta t$. Similarly, as an alternative or in addition, a sliding average value of the traction force $<F_x(v, ST)>$ is formed depending on the respective velocity v and gradient ST.

At the time t0, a coasting phase S begins, during which the motor vehicle drive is switched off or is stepped into idle running, and the automatic transmission 10 is brought, depending on the design, into the neutral position or into a decoupled state by opening of a torque-conducting clutch. As can be seen in the present example, the coasting phase occurs during downhill travel with a negative gradient ST. During the coasting phase S, the driver's rotational speed requirement Wn is formed depending on the current velocity v* and the current gradient ST* and taking into consideration the stored sliding average value of the rotational speed level N for the current velocity v* and the current gradient ST* and is changed constantly as the gradient ST* and/or velocity v* changes.

Similarly, the driver's traction force requirement $WF_x$ is formed corresponding to the instantaneous velocity v* and the instantaneous gradient ST* taking into consideration the stored sliding average value of the traction force level $F_x$. At least one gear choice G is determined from said rotational speed requirement Wn and/or traction force requirement $F_x$. It is even optionally possible for a plurality of gear choices to be determined and appropriately prioritized (cf. FIG. 5).

With continuous adaptation of the rotational speed requirement Wn and of the traction force requirement $WF_x$, the gear choice is also changed correspondingly. At the end of the coasting phase S, the current velocity v' and the current gradient ST' is at the time t1. A rotational speed requirement Wn' and/or a traction force requirement $WF_x'$ can be derived analogously therefrom. If the coasting phase is only very short or if the newly interpreted driver's requirement at the end of the coasting phase corresponds to the recorded data (from FP and/or dFP/dt), then said gear choice G which is determined from the history can immediately defined as the final gear choice and the automatic transmission 10 can be correspondingly shifted if this has not already happened in advance by a prior gear selection.

However, the gas pedal actuating value FP and/or the gas pedal actuating gradient dFP/dT will regularly change during the coasting phase S, thus requiring a corresponding adaptation in order to arrive at the final gear choice G'.

FIG. 3 shows a flow diagram for explaining an embodiment of the gear selection method according to aspects of the invention for an automatic transmission for a traction phase after a coasting phase of a motor vehicle.

In the embodiment of the method according to aspects of the invention according to FIG. 3, defined gear choice cannot be pre-engaged in the automatic transmission 10.

The program begins at step S0. In step S1, a sliding average value of the rotational speed level n and/or of the traction force level $F_x$ is formed depending on the respectively current velocity v and respectively current gradient ST for a predetermined time interval Δt, the length of which can be variable depending on at least one driving parameter, for example the driving velocity v. Said step S1 runs, as it were, in an endless loop. Said time interval can be selected to be of a length such that other coasting phases may also be included therein. It is checked in step S2 whether a coasting phase is active. If this is not the case, the method jumps back to step S0.

If a coasting phase is activated, the method branches from step S2 to step S8, in which the instantaneous velocity v* and the instantaneous gradient ST* in the coasting phase are each determined.

With reference to the data recorded from S1, the instantaneous velocity v* and the instantaneous gradient ST*, the rotational speed requirement Wn is defined in step S9a and/or the traction force requirement $WF_x$ is defined in step S9b.

At least one gear choice G is defined in step S10 on the basis of the rotational speed requirement Wn and/or the traction force requirement $WF_x$. Said gear choice G is adapted continuously corresponding to the instantaneous velocity v* and/or to gradient ST* during the coasting phase S.

At the same time, it is continuously checked in step S3 whether a transition to the next traction phase (Z2 in FIG. 2) is expedient. If this is not the case, the method jumps back and carries out the steps S8 to S10 in an endless loop.

If it is recognized in step S3 that a transition to the next traction phase is taking place, then the steps S4a, S4b, S4c are carried out to reassess the situation regarding requirements.

In detail in steps S4a and S4b, a current gas pedal actuating value FP and/or a current gas pedal actuating gradient dFP/dT are determined, and, on the basis thereof, in step S4a the rotational speed requirement Wn and/or, in step S4b, the traction force requirement $WF_x$ are/is corrected. In this case, the rotational speed requirement and the traction force requirement, weighted in a defined manner from the recorded data, can enter into the determination of the values for the rotational speed and the traction force at the end of the coasting phase. If said new values deviate from the corresponding values defined in step S9a and S9b, the gear choice G defined in step S10 is replaced by a final gear choice G' defined in step S4c.

Subsequently, the final gear choice G' is engaged in step S5 while, in step S6, the rotational speed level n of the engine is synchronized with the defined, final gear choice G'.

Finally, in step S7, a frictional connection is obtained by letting in the clutch, after which the method jumps back to step S0 and the formation of the sliding average values of the rotational speed level n and/or of the traction force level $F_x$ is continued or begun again.

Figure 4:
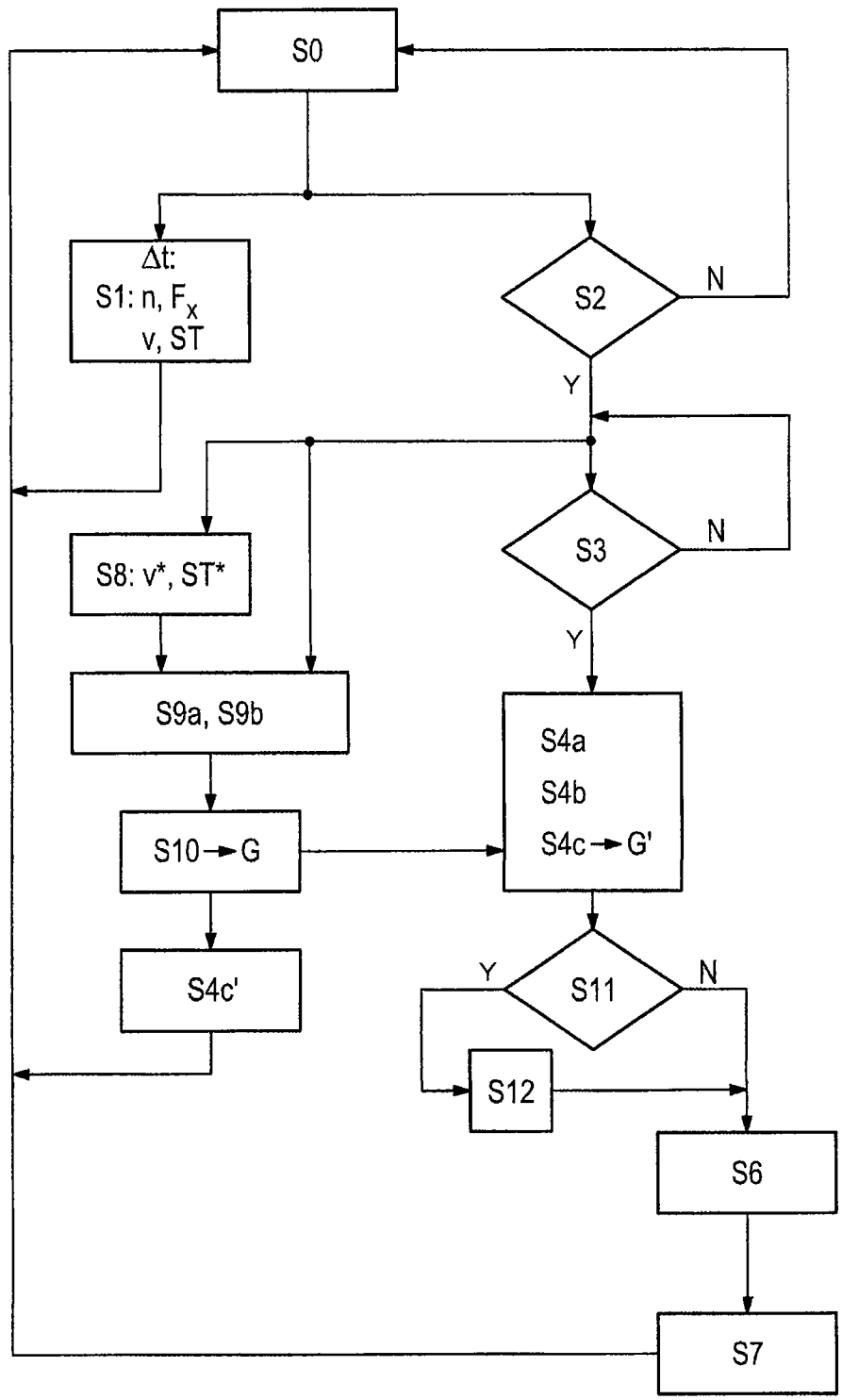
FIG. 4 shows a flow diagram for explaining another embodiment of the gear selection method according to aspects of the invention for an automatic transmission for a traction phase after a coasting phase of a motor vehicle.

FIG. 4 shows a flow diagram for explaining another embodiment of the gear selection method according to aspects of the invention for an automatic transmission for a traction phase after a coasting phase of a motor vehicle.

In the embodiment illustrated in FIG. 4, pre-engagement of a single defined gear choice G is possible in the automatic transmission 10. In contrast to the above first embodiment of the method according to aspects of the invention according to FIG. 3, this takes place in step S4c' which directly adjoins the step S10 of defining the respectively current gear choice G.

If, in the second embodiment, it is recognized in step S3 that a transition to a coming traction phase takes place, then, as in the above-described embodiment, the rotational speed requirement Wn and/or the traction force requirement $WF_x$ are/is re-evaluated in steps S4a and/or S4b.

In this case, the rotational speed requirement and the traction force requirement, weighted in a defined manner from the recorded data, can enter into the determination of the values for the rotational speed and the traction force at the end of the coasting phase.

It is checked in step S11 whether a shifting operation is necessary in accordance with the result from step S4c. If a shifting operation is not necessary, then, as in the first embodiment, the rotational speed of the engine is synchronized in step S6 and, in step S7, a frictional connection to the transmission which is already in the chosen gear is produced.

If a shifting operation is necessary, the latter is carried out after step S11 in step S12 before subsequently, in step S6 the rotational speed n of the engine is synchronized. The gear requirement G is selected in such a manner that a shifting operation is more likely to be necessary if the dynamic requirement has dropped, as a result of which there is a tendency for more time to be available. In the case of transmissions having different shifting times, depending in each case on the gear change, the pre-engaged gear can also be selected such that there is a tendency only for shifting operations with short shifting times to be necessary.

As in the first embodiment, the method branches back after step S7 to step S0.

Figure 5:
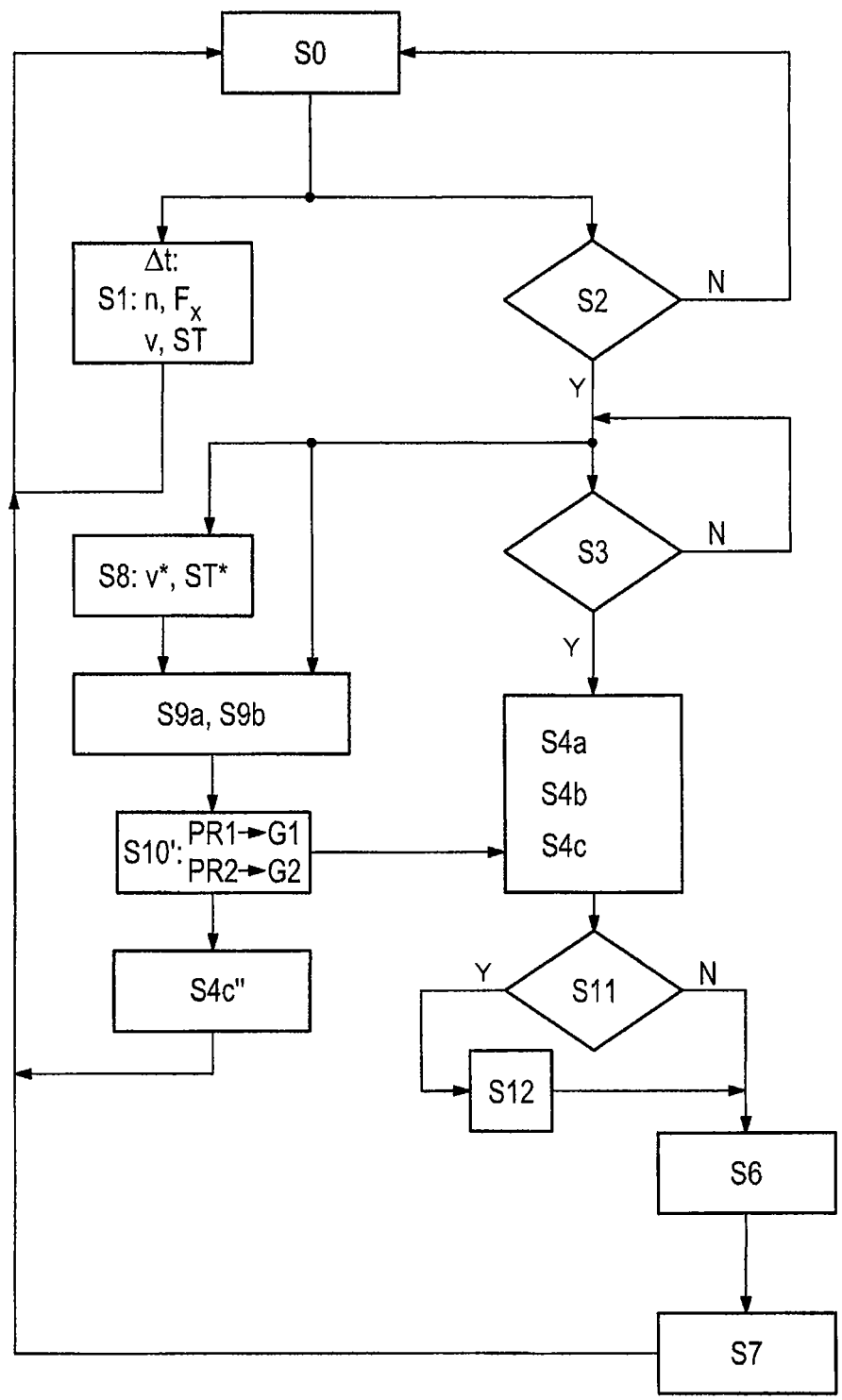
FIG. 5 shows a flow diagram for explaining yet another embodiment of the gear selection method according to invention for an automatic transmission for a traction phase after a coasting phase of a motor vehicle.

FIG. 5 shows a flow diagram for explaining yet another embodiment of the gear selection method according to aspects of the invention for an automatic transmission for a traction phase after a coasting phase of a motor vehicle.

In the third embodiment of the method according to aspects of the invention, the automatic transmission 10 permits pre-engagement of two defined gear choices G1, G2.

Correspondingly, after the steps S9a, S9b for determining the rotational speed requirement Wn and/or the traction force requirement $WF_x$, a first and a second gear choice G1 and G2 having a corresponding higher first priority PR1 and a corresponding lower second priority PR2, respectively, are defined. The priorities PR1, PR2 can be selected, for example, such that the sporty, higher gear is privileged.

The first gear choice G1 corresponds to a rotational speed requirement and/or traction force requirement above the value determined by the sliding average, and the second gear choice G2 corresponds to a rotational speed requirement and/or traction force requirement below the value determined by the sliding average.

In step S4c″ following step S10′, the two defined gear choices G1, G2 are engaged.

Analogously to the two above-described embodiments, in the event that the examination in step S3 reveals a positive result, in steps S4a, S4b, the rotational speed requirement Wn and/or the traction force requirement $WF_x$ are/is re-evaluated and, in step S4c, the gear choices G1, G2 may be changed and one of the gear choices finally selected in accordance with the greater priority.

The following steps S11, S12 or S6, S7 proceed analogously, as already explained above with reference to the second embodiment of the method according to aspects of the invention.

Although the present invention has been described above with reference to preferred exemplary embodiments, it is not restricted thereto but rather can be modified in diverse ways.

The invention claimed is:

1. A gear selection method for an automatic transmission for a traction phase (Z2) after a coasting phase (S) of a motor vehicle, comprising the steps of;
    forming, with a computational device, a sliding average value of a rotational speed level (n) and/or of a traction force level (Fx) in a traction phase (Z1) before the coasting phase (S) depending on a particular velocity (v) and a particular gradient (ST),
    storing, in a memory device, the sliding average value of a rotational speed level (n) and/or of a traction force level (Fx), and
    defining, with a defining device, at least one gear choice of the automatic transmission for the traction phase (Z2) after the coasting phase (S) taking into consideration the sliding average value,
    wherein a driver's rotational speed requirement (Wn) is defined taking into consideration the sliding average value of the rotational speed level (n) for a current velocity (v') and a current gradient (ST') at the end of the coasting phase (S) and a corresponding first and second gear choice are defined on the basis thereof,
    wherein the first gear choice corresponds to a rotational speed requirement (Wn) above the value determined by the sliding average, and
    wherein the second gear choice corresponds to a rotational speed requirement (Wn) below the value determined by the sliding average.

2. The method as claimed in claim 1, wherein a driver's rotational speed requirement (Wn) is defined taking into consideration the sliding average value of the rotational speed level (n) for a current velocity (v') and a current gradient (ST') at the end of the coasting phase (S) and a corresponding gear choice is defined on the basis thereof.

3. The method as claimed in claim 1, wherein a driver's traction force requirement (WFx) is defined taking into consideration the sliding average value of the traction force level ($F_x$) for a current velocity (v') and a current gradient (ST') at the end of the coasting phase (S), wherein the traction force requirement (WFx) is converted into a corresponding rotational speed/engine torque requirement and a corresponding gear choice is defined on the basis thereof.

4. The method as claimed in claim 1, wherein a driver's traction force requirement (WFx) is defined taking into consideration the sliding average value of the traction force level ($F_x$) for a current velocity (v') and a current gradient (ST') at the end of the coasting phase (S), wherein the traction force requirement (WFx) is converted into a corresponding rotational speed requirement and a corresponding first and second gear choice are defined on the basis thereof, wherein the first gear choice corresponds to a traction force requirement (WFx) above the value determined by the sliding average, and wherein the second gear choice corresponds to a traction force requirement (WFx) below the value determined by the sliding average.

5. The method as claimed in claim 1, wherein at the time of the end of a particular coasting phase (S), a determination of a current gas pedal actuating value and/or of a current gas pedal actuating gradient is carried out and the at least one defined gear choice is adapted depending thereon.

6. The method as claimed in claim 1, wherein the automatic transmission does not permit pre-engagement of the defined gear choice, and the gear choice is engaged at the end of the coasting phase (S), the rotational speed at the end of the coasting phase (S) is synchronized and subsequently a frictional connection is established.

7. The method as claimed in claim 1, wherein the automatic transmission permits pre-engagement of a single defined gear choice, and the gear choice is engaged during the coasting phase (S), the rotational speed at the end of the coasting phase (S) is synchronized and subsequently a frictional connection is established.

8. The method as claimed in claim 1, wherein the automatic transmission permits pre-engagement of two defined gear choices, and the first and second gear choices are engaged during the coasting phase (S), a gear from the first and second gear choices, which gear is prioritized in accordance with a predefined criterion, is defined at the end of the coasting phase (S) as a final gear choice, the rotational speed at the end of the coasting phase (S) is synchronized and subsequently a frictional connection is established.

9. The method as claimed in claim 8, wherein the higher gear of the first and second gear choices is defined at the end of the coasting phase (S) as the final gear choice.

10. The method as claimed in claim 1, wherein a time window (at) within which the sliding average value of the rotational speed level (n) and/or of the traction force level ($F_x$) is formed is variable depending on at least one driving parameter.

11. The method as claimed in claim 1, wherein selection of an engaged gear takes into consideration that shifting times differ in length.

* * * * *